United States Patent

Stix

[15] 3,663,362
[45] May 16, 1972

[54] CONTROLLED FUSION REACTOR
[72] Inventor: Thomas H. Stix, Princeton, N.J.
[73] Assignee: The United States of America as represented by the United States Atomic Energy Commission
[22] Filed: Dec. 22, 1970
[21] Appl. No.: 100,734

[52] U.S. Cl. ........................................176/4, 176/2, 313/63
[51] Int. Cl. .......................................................G21b 1/00
[58] Field of Search .................................176/3, 4, 2; 313/63

[56] References Cited

UNITED STATES PATENTS

3,036,963  5/1962  Christofilos..............................176/4
3,071,525  1/1963  Christofilos..............................176/4
3,577,317  5/1971  Woods......................................176/4

Primary Examiner—Reuben Epstein
Attorney—Roland A. Anderson

[57] ABSTRACT

Method and apparatus for plasma confinement and/or heating in a toroid-like magnetic system, wherein a dense electron-rich sheath is maintained between the surface of a toroid-like body of quasi-neutral plasma and an adjacent conducting wall or grid in order to create a deep electrostatic potential well for the ions of said quasi-neutral plasma and thus to enhance the confinement of ions in said system and/or to accelerate injected ions for the heating of said plasma.

17 Claims, 4 Drawing Figures

CONTROLLED FUSION REACTOR

BACKGROUND OF THE INVENTION

Economic operation of a controlled fusion reactor necessarily requires plasma confinement adequate so that the thermonuclear energy released by the interacting plasma particles considerably exceeds the net input energy required to heat and maintain the plasma at its nuclear kindling temperature. Various proposals to this end have been studied, including many well-known toroidal and linear magnetic field devices for magnetic confinement. These devices utilize magnetic pressure to isolate the quasi-neutral plasma from the inside walls of a vacuum container and thus prevent cooling of the interacting plasma particles. However, the method of operation of these devices has been limited to the magnetic confinement of a quasi-neutral plasma of ions and electrons. The modification of magnetic confinement of quasi-neutral plasmas by maintaining dense surface electron-rich sheaths to create strong surface electric fields and to create deep ion-confining potential wells and/or the possibility of heating said plasmas by accelerating injected ions through such strong surface electric fields have heretofore not been proposed.

A different application of the same principles in plasma physics lies in the production and confinement of highly-stripped heavy ions. The advantageous use of strong electric fields to enhance the ion confinement in linear ion-stripping devices is described in the inventor's co-pending U.S. Pat. application, Ser. No. 856,337, filed Sept. 9, 1969, now U.S. Pat. No. 3,611,024, Ser. No. 68,828 filed Sept. 2, 1970, and both assigned to the assignee of this application.

SUMMARY OF THE INVENTION

This invention, made in the course of research supported in part under a contract with the United States Atomic Energy Commission, provides a dense electron-rich sheath between the surface of a toroid-like quasi-neutral plasma and an adjacent wall or grid in order to create a powerful quasi-static electric field at the surface of said plasma which is immersed in a toroid-like magnetic field. By means of said electric field the plasma is placed at an electric potential which is strongly negative with respect to said adjacent wall or grid. The confinement of the ions is enhanced by the surface electric field; in fact, the ions may be considered to be confined in a quasi-electrostatic well of enormous depth. Electrons tend to be restricted to their surfaces of constant total energy and are also confined in this "magnetoelectric" system.

The occurrence of modest electric fields in the vicinity of the surface of a quasi-neutral plasma under toroidal magnetic confinement is a well-known laboratory phenomenon. However, the distinguishing feature of the "magnetoelectric" method of plasma confinement as proposed in this patent application is the maintenance of a dense electron-rich sheath in the region between the surface of the toroid-like body of quasi-neutral plasma and an adjacent conducting wall or grid. This dense electron-rich sheath produces an electric field in this region which is of sufficient power and extent to cause electrostatic containment of the bulk of the plasma ions. To achieve this purpose the depth of the potential well produced by the surface electric field is at least several times larger than the average kinetic energy per unit charge associated with the plasma ions.

In one aspect of the invention, the confinement of ions in a toroid-like magnetic system is enhanced by the maintenance of a dense electron-rich sheath at the surface of a toroid-like body of quasi-neutral plasma and by the presence of the powerful electric fields created by said sheath and by the presence of the deep ion-confining electrostatic potential well associated with said electric fields.

In another aspect of the invention, the magnetoelectric-confined quasi-neutral toroid-like plasma may comprise a dense quasi-static medium of approximately uniform density, temperature and pressure. These qualities are each favorable for plasma stability.

In a different aspect of the invention, the toroid-like magnetic field may have axial symmetry and only a toroidal component, the magnetic lines of force being closed, the rotational transform being zero, and the poloidal and sausage components of said magnetic field being zero. Heretofore confinement of a static finite-pressure neutral plasma in such a magnetic configuration had not been considered possible, but in this instance the presence of powerful quasi-static surface electric fields permits the occurrence of a plasma equilibrium.

In a further aspect of the invention, ions from an external source, accelerated by the strong electric fields at the surface of a toroid-like quasi-neutral plasma, may be injected into said plasma and cause said plasma to be heated.

The aspects discussed above are not necessarily mutually exclusive, and two or more of these aspects may be present simultaneously in the same toroidal plasma. Moreover, the apparatus related to any of these aspects may have a purpose either for the production of power in a controlled thermonuclear reactor or for the production of highly stripped ions.

In addition to providing novel methods for the confining and/or heating of plasma or of plasma ions, this invention also provides methods for the production and maintenance of the dense electronrich sheath which is the distinguishing feature of magnetoelectric confinement. Said methods include magnetic electron injection, radio frequency magnetic electron injection, and fusion-product ion ejection.

Furthermore, the invention provides additional methods for the maintenance of said dense electron-rich sheath, the intermediate purpose of said additional methods being to suppress or attenuate plasma oscillations and instabilities the presence of which could cause leakage of negative charge away from said sheath, accompanied by the undesirable reduction in the strength of the electric fields at the plasma surface. Said additional methods include causing the plasma surface to lie almost everywhere very close to a metal grid or wall, and/or the use of feedback and dynamic stabilization apparatus and techniques specifically to suppress or attenuate said oscillations and instabilities.

The above and further objects and novel features of this invention will become apparent from the following detailed description of several embodiments when the same is read in connection with the accompanying drawings, and the novel features will be particularly pointed out in the appended claims.

DETAILED DESCRIPTION OF ONE EMBODIMENT

Since 1952 the main thrust of controlled nuclear fusion research has been toward the confinement of neutral plasmas by strong static magnetic fields. However, in accordance with this invention, the imposition of a large electrostatic bias introduces a new degree of freedom into the design of equilibria and allows several novel objectives and practical applications immediately to be obtained. In particular, this invention can provide a dense, static, uniform-pressure plasma to be confined in a toroid-like configuration with toroid-like electrostatic potential surfaces. To this end, this invention can provide a negative electrostatic potential well of enormous depth, thus enhancing the confinement of ions on the basis of simple conservation of single-particle energy, and also providing confinement for electrons on this same basis. Also, the necessary negative electrostatic potential is maintained by electron-injection means or spontaneously by the ejection from a controlled fusion plasma of fusion-product ions with energies in the range of millions of electron volts per ion.

To aid in understanding the physical basis of this invention, the differences between magnetic confinement and electrostatic confinement may be clarified. From one point of view, magnetic confinement may be attributed to the tendency of single charged particles, i.e., ions and electrons, to follow magnetic lines of force. As is well known, however, the actual trajectories of ions and electrons may deviate widely from the magnetic lines because of a variety of effects which include drift motions due to the presence of uniform static electric fields, or to the presence of time-varying or space-varying electric or magnetic fields. Of particular importance are particle drifts due to inhomogeneity and curvature of the toroid-like magnetic system itself, and particle diffusion or transport which may be attributed to self-consistent electric fields, both stationary and time-varying, which may arise inside the quasi-neutral plasma. Successful operation of a magnetic-confinement plasma device requires that the drift, convection, diffusion and transport of ions and electrons due to such processes all be held to satisfactorily minimal levels. However, magnetic plasma containment which is satisfactory for controlled fusion or for heavy-ion stripping has yet to be achieved. In seeking to control the too-rapid transport of particles across the magnetic lines of force, plasma physicists have suggested various stabilization schemes including the well-known proposals for stabilization by magnetic shear by "minimum-B" and by "average minimum-B." Now generally speaking, it requires little or no energy to transport charged particles across magnetic lines of force by any of the processes itemized above. The magnetic stabilization schemes which have been proposed would require some finite positive energy, at least on the average, for such outward transport of particles. However, the average amount of energy per particle required for such transport even with some form of magnetic stabilization is still small compared with the average kinetic or thermal energy per particle, and laboratory experiments have shown only partial success by these schemes in reducing cross-field transport processes.

Electrostatic containment describes the retention of a particle by electric fields in an electrostatic potential well. To escape this well the particle must receive additional kinetic energy in the amount of the difference between its "thermal" kinetic energy and the well depth energy. In the electrostatic confinement of ions in this invention, the well depth energy is at least several times the average kinetic energy per particle, and can be many times this average energy. In either case massive amounts of additional kinetic energy must be supplied to the ions in order for more than a very small fraction to them to escape. Only very weak processes are available by which energy can be transferred to the ions from other sources in the system, therefore electrostatic containment of ions under these circumstances is an ultra-stable, ultra-positive form of ion confinement.

It is obvious, however, that similar energy considerations are unfavorable to the confinement of electrons in a magnetoelectric system. Inside the main body of quasi-neutral plasma in this invention, the electric fields are small or zero. However, at the surface of the body of quasi-neutral plasma in this invention, there are powerful electric fields which confine the ions within the system and these same electric fields will simultaneously tend to eject the local electrons, namely, the very electrons which form the electron-rich sheath which in turn is responsible for these same surface electric fields. Now the electrons are still magnetically confined and their motion in the magnetic field is such that they tend to remain on their surfaces of constant energy. Nevertheless, the magnetic confinement of the electrons in this system is a much-lower-quality type of confinement than the electrostatic ion confinement, and the success of magneto-electric confinement depends on success in achieving satisfactory magnetic confinement of the electrons in the system. The immediate effect of electron loss would be to reduce the magnitude of the surface electric fields with consequent deterioration of both ion and electron confinement. The importance of maintaining the dense electron-rich sheath by whatever effective means can be found is precisely to avoid such an undesirable outcome.

Figure 2:
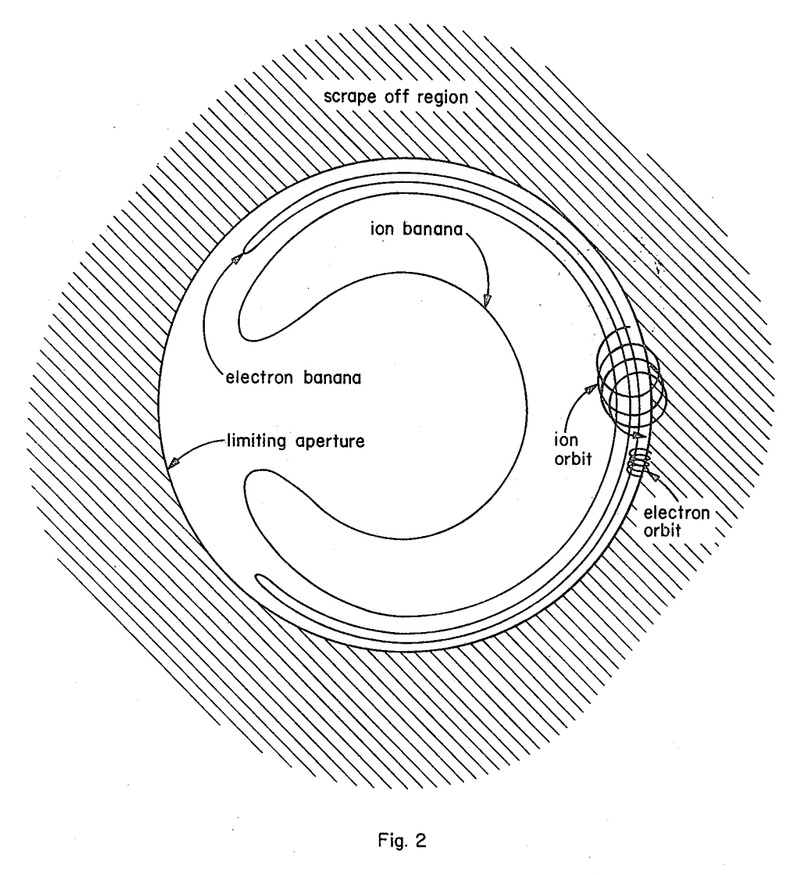
FIG. 2 is a sketch illustrating the scrape-off process for ions and electrons in a conventional toroidal plasma device such as a tokamak or a stellarator.

Now in any conventional toroidal magnetic plasma device including tokamaks, stellarators, levitrons, spherators, floating-ring multipoles, and so forth, there is a process which tends to produce an electron-rich sheath at the plasma surface and which tends to create a strong ion-confining electrostatic potential well. This process involves the scrape-off at the plasma boundary of electrons and ions with vastly different gyro-radii. As an example, the scrape-off process for the tokamak geometry is depicted in FIG. 2. For illustrative purposes we refer to the reactor conditions for a toroidal fusion reactor described by R. G. Mills in Nuclear Fusion, 7, 223 (1967), namely, $B = 65\ kG$, $kT_i = 10\ keV$, $kT_e = 13.5\ keV$, $n_D$ (deuterium ion density) $= n_T$ (tritium ion density) $= 2.5 \times 10^{14}$ cm$^{-3}$, $\tau$ (confinement time) $= 1.0$ sec. a (minor plasma radius) $= 100$ cm, $R$ (major plasma radius) $= 1,270$ cm. Under these conditions the rms Larmor radii are $5.9 \times 10^{-3}$ cm, 0.50 cm and 3.4 cm respectively for the electrons, thermal ions, and 3.52 MeV fusion-product alpha particles, and the D-T nuclear reaction produces $6.6 \times 10^{12}$ alpha particles per cm$^3$ per second.

Assuming a uniform distribution of density, one half of the alpha particles born in the strip of width $2\rho_{L\alpha} = 6.8$ cm just inside the scrape-off surface will intercept the scrape-off surface and will be lost. This transport and loss of positive charge corresponds to the build-up of negative charge in a layer of average depth $0.75 \times 3.4 = 2.6$ cm at the rate of $2 \times 6.6 \times 10^{12} \times 3.4 = 4.5 \times 10^{13}$ electron charges per second per cm$^2$ of surface. To balance the loss of positive charge, electrons will be removed from the layer of corresponding thickness, $2\tau_{Le} = 1.2 \times 10^{-2}$ cm, at the scrape-off surface. Because of the difference in the thicknesses of the alpha and electron loss regions, an electric field will tend to build up which will increase the negative bias of the plasma at the rate of $2.1 \times 10^8$ volts per second. At this rate the bias would build up to its saturation value, $1.76 \times 10^6$ V, in 8.5 milliseconds.

Differential guiding center drifts also tend to create an electric field near the plasma surface but penetrating somewhat more deeply than the field just described. Such drifts in toroidal geometry are typified by the banana orbits pictured in FIG. 2. The maximum thickness of such a banana is $2^{3/2}r_p (r/R)^{1/2}$, where $r_p$ would be the particle gyro-radius in the poloidal field. H. L. Berk and A. A. Galeev, in Physics of Fluids 10 441 (1967), estimate that an electric potential of order. $(kT_e/e)(r/R)^{1/2}$ develops in the banana region due to loss of resonant ions (i.e., those with small net poloidal velocity) out of the thermal ion distribution. Crudely extending this estimate to the confinement of the fusion-product alpha particles, the potential difference over the banana region would be more than 600 kV for Mills' model plasma.

Less dramatic but similar considerations apply to experimental plasmas in the laboratory. As indicated above, loss of thermal distribution ions by the two mechanisms, finite Larmor radius displacement and, for resonant ions, large guiding center displacement tends to give a toroidal plasma a negative bias. More important, however, the loss of suprathermal ions, such as ohmic or cyclotron heating runaways, may cause the magnitude of this bias to be large compared to $kT_i$.

Thus, even for initially-neutral toroidal plasmas, there exist mechanisms for the spontaneous production of a strong negative bias. When the increase in plasma space potential, $\Delta\phi$, over the distance of an ion Larmor radius is large compared to $kT_i/Ze$, the dynamics of ion confinement become electrostatic rather than magnetic. For $\Delta\phi >> kT_i/Ze$, such confinement of ions is close to perfect.

One may, of course, expect mechanisms to appear which will compete with the build-up of the strong surface electric fields just described. Any mechanism which can transport electrons from the plasma surface to the wall will thereby contribute to the neutralization of the negative plasma bias. Classical diffusion of electrons, that is, diffusion of electrons across the magnetic field caused by two-particle ion-electron Coulomb collisions, will be one such process. More important for toroidal plasmas is the possibility of instability with respect to diocotron modes. Although the nonlinear behavior of diocotron instabilities has not yet been fully analyzed, one may conjecture that one consequence of large amplitude perturbations of the plasma under these instabilities could be the transport of electrons in the direction of increasingly positive quasi-static potential, i.e., in our case, transport of electrons from the plasma to the vacuum chamber wall. The small-amplitude theory of these instabilities has however, been analyzed: O. Buneman, R. H. Levy, and L. M. Linson, in the Journal of Applied Physics, 37, 3203 (1966), find that the growth rate of the short wavelength diocotron mode, $\omega_i$, is given approximately by the formula $$\omega_i \approx \tfrac{1}{2} q \omega_{ce} \exp(-2/q) \qquad (1)$$

where $$q \equiv \frac{4\pi n_0 m_e c^2}{B^2} = 1.03 \times 10^{-5} \frac{n_0}{B^2}, \qquad (2)$$

and $$\omega_{ce} \equiv \frac{eB}{m_e c} = 1.76 \times 10^7 B \text{ radians per second}, \qquad (3)$$

and where $n_0$ is the electron density in the sheath in cm$^{-3}$, $m_e$ is the electron mass in grams, $c$ is the velocity of light in cm/sec, $B$ is the average magnetic field strength in gauss, and $e$ is the electron charge in statcoulombs. From Eqs. (1), (2) and (3) and for the case where $n_0 = 10^{14}$ cm$^{-3}$ and $B = 150$ kilogauss, which are the parameters suggested for one embodiment of this invention, one finds a theoretical growth time, $(\omega_i)^{-1}$, for this short wavelength diocotron mode of several years. The short wavelength diocotron instability is therefore not expected to introduce any difficulties for plasma confinement for apparatus of this invention operated within the proper range for the $n_0/B$ ratio.

The other important diocotron instability is the long wavelength mode which, for the case where both ion and electrons are present, has been called the "two-fluid diocotron instability." In an analysis of small-amplitude perturbations for this mode, T. H. Stix, in "Stability of a Cold Plasma under Magnetoelectric Confinement" published in Physics of Fluids, Vol. 14, No 3, pp. 702–712, Mar. 1971 finds that the system is stable provided that (a) the density of electrons in the sheath is approximately equal to the density of electrons in the main body of quasi-neutral plasma, and (b) that the electron sheath extends out almost all the way to the wall.

Figure 3:
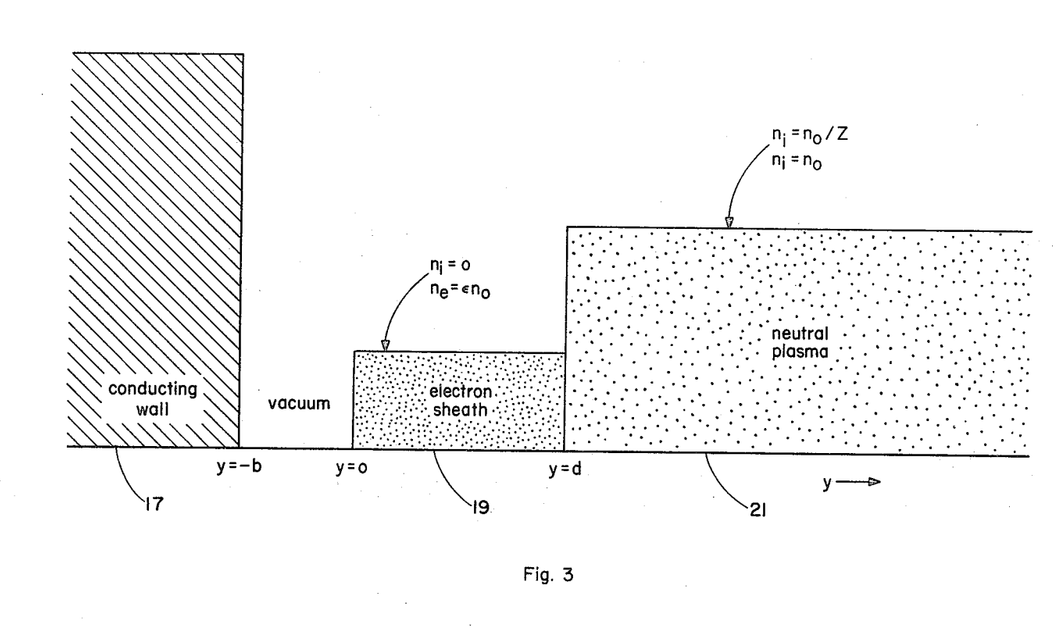
FIG. 3 is a sketch of the density distribution for electrons and ions for a plasma under magnetoelectric confinement.

The configuration investigated by Stix in this stability paper is illustrated in FIG. 3. For simplicity, plane rather than toroidal geometry is used. Particle densities in the vicinity of the wall are plotted versus distance from the wall. Starting at the left of the drawing, the conducting wall, 17, is placed at $y = -b$. A vacuum gap separates the wall from the electron sheath, 19, which begins at $y = 0$. The electron density is uniform in the sheath and, for the sake of generality, is illustrated as equal to $\epsilon$ times the ion density per unit charge in the neutral plasma, 21, which commences at $y = d$. The ion density in the sheath is taken to be 0.

Now, in general, the thickness, $d$, of a sheath of un-neutralized electrons with uniform density $n_0$ and the thickness, $b$, of the vacuum gap between the electron sheath and the vacuum chamber wall are related to the magnitude of the potential difference, $V$, between the plasma body and the wall by the following relation, based simply on the Poisson equation which is well known in the theory of electrostatics, $$d[1 + 2(b/d)]^{1/2} = 1.05 \times 10^3 (V/n_0)^{1/2} \qquad (4)$$

where the distances, $d$ and $b$, are in centimeters, $V$ is in volts, and $n_0$ is in cm$^{-3}$.

The stability criterion derived by Stix in the above-cited reference creates an additional relation between the parameters for the plasma: stability of the two-fluid diocotron mode according to this calculation is satisfied if (a) the unneutralized electron density in the sheath is the same as the electron density in the body of quasi-neutral plasma, i.e., if $\epsilon = 1$, and (b) if the vacuum gap thickness, $b$, is smaller than $b_c$, where $b_c$ is found by solving the cubic equation $4x^3 - (12s - 8)x^2 + (12s^2 + 20s + 4)x - (s^2 + 4s^3) = 0$ (5) where $$x \equiv [1 + (4\pi n_i m_i c^2/B^2)] \tanh k b_c,$$

$$s \equiv kd(4\pi n_i m_i c^2/B^2)$$

and where $n_i$ is the density of ions in the main body of plasma in cm$^{-3}$, $m_i$ is the average mass for an individual ion in the main body of plasma in grams, $c$ is the velocity of light in cm/sec, $B$ is the average value in gauss of the magnetic field, and $k$ is the wave-number in cm$^{-1}$ of the perturbation for which the stability is under consideration. In toroidal geometry, it is appropriate to set $k = m/a$ where m is the integer representing the azimuthal mode number and "a" is the minor radius, in cm, of the torus. The smallest value for $b_c$ is expected to occur for the smallest allowable value for $m$, namely $m = 1$.

Figure 4:
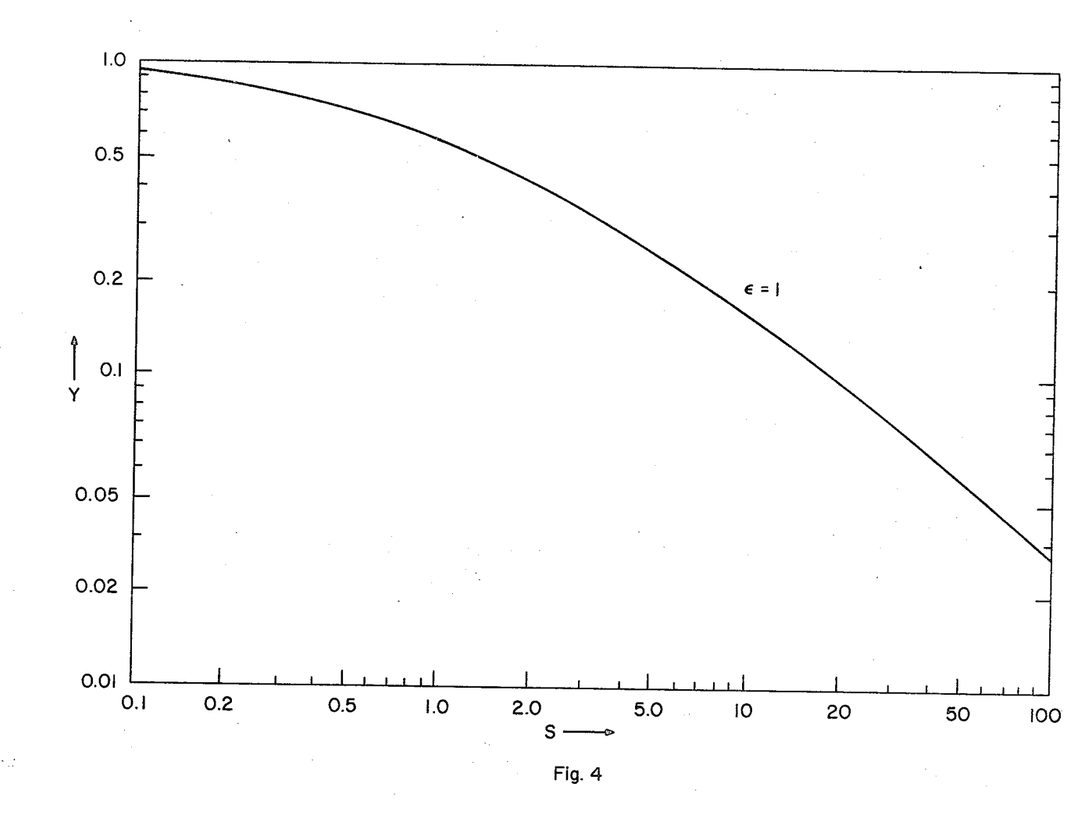
FIG. 4 is a graph of the solution of Eq. (5), and represents the condition of marginal stability for the two-fluid diocotron mode.

For convenience in finding approximate solutions to Eq. (5), FIG. 4 may be used. Thus the value of $Y \equiv 4xs^{-2}$ corresponding to a selected value of $s = kd(4\pi n_i m_i c^2/B^2)$ may be read from the graph in FIG. 4, which represents a solution of the stability problem for the case $\epsilon = 1$. Then $b_c$ is given by the relation $$b_c = \frac{1}{k} \tanh^{-1} \frac{s^2 Y}{4[1 + (4\pi n_i m_i c^2/B^2)]} \qquad (6)$$

For example, typical conditions for a controlled fusion plasma under magnetoelectric confinement could be a toroidal static magnetic field of average strength equal to 150 kilogauss, an electron density of $1.0 \times 10^{14}$ cm$^{-3}$, and densities of deuterium and tritium ions each equal to $5.0 \times 10^{13}$ cm$^{-3}$. Now as described above, the steady loss of fusion-product alpha particles will tend to bias the plasma negative with respect to the wall. However, in accordance with the immediately preceding discussion, the plasma will be stable with respect to the two-fluid diocotron instability provided (a) that the electron density in the bias-producing electron sheath is the same as the electron density in the neutral plasma, namely, $1.0 \times 10^{14}$ cm$^{-3}$, and (b) that this sheath extend almost to the wall. In particular, if, for example, the negative plasma bias reaches a quasi-steady state value of $1.5 \times 10^8$ volts, then the thickness of the electron sheath will be about 0.13 cm in accordance with Eq. (4) above, while the maximum allowable thickness for the vacuum gap between the sheath and the vacuum chamber wall (or a suitable metal grid simulating, for this purpose, a perfect equipotential surface) is, in accordance with Eq. (5) above, or equivalently, in accordance with Eq. (6) above and FIG. 4, approximately 0.015 cm in this case.

Summarizing, mechanisms exist whereby a toroidal plasma either spontaneously becomes negatively charged with respect to an adjacent conducting wall enveloping said plasma, or whereby electrons may be injected into said plasma to cause it to become so negatively charged. One such spontaneous mechanism is the tendency for a dipole layer of charge to develop as large-Larmor-radius ions such as d-t fusion product alpha particles are scraped off the plasma surface together with an equal number of small-Larmor-radius electrons. When the excess negative charge on the plasma is able to build up to a sufficient amount so that the potential difference between the conducting wall and the plasma exceeds by several times the average energy per unit charge of the plasma ions, then the ion confinement may be enormously enhanced by virtue of the location of said ions within this powerful electrostatic potential well. Electrons, which tend to be restricted to their surfaces of constant total energy, are also well confined in this toroidal magnetoelectric configuration. Now, good confinement for ions and electrons is a pre-requisite for a successful controlled thermonuclear reactor, and good ion confinement is also a pre-requisite for a successful heavy-ion stripper. In order, therefore, to preserve the improvements in confinement of ions and electrons brought about by the occurrence of powerful electric fields at the surface of a plasma in a toroid-like magnetic geometry, it is advantageous to suppress or attenuate mechanisms which would allow the desirable excess of negative charge to leak off said plasma. It is conjectured that the most dangerous such mechanism would be the two-fluid diocotron instability if the amplitude of this mode were allowed to grow to appreciable magnitudes. Therefore to prevent the two-fluid diocotron mode from growing to such undesirable large amplitudes, special factors must be taken into consideration in the design and construction of a toroidal plasma device for which the advantages of magnetoelectric confinement are to be retained. In particular, it is advantageous that there be a conducting wall or grid very close to the surface of the plasma, with a separation distance almost everywhere typically of order or less than a centimeter. Moreover, it is advantageous that this conducting wall or grid be constructed and oriented with extreme care in order that its surface be almost everywhere parallel to the local magnetic field. Deviations between this wall or grid and the magnetic lines of force can lead to the scrape-off of electrons in the bias-producing electron sheath. Therefore, in accordance with Eq. (5), or equivalently in accordance with Eq. (6) and FIG. 4, it is advantageous that such deviations between the wall or grid surface and the magnetic lines of force be minimized and perhaps even held to a small fraction of a millimeter.

An alternative or supplementary way for limiting the disruptive effects of the two-fluid diocotron instability is by negative feedback control. One manner in which negative feedback control could be effected would be to locate a system of sensor electrodes in the wall or grid adjacent to the plasma. These sensors could be flush with the wall or grid surface and held close to the wall or grid potential. However, monitoring the current which flows in and out of the individual sensor electrodes would give a direct measurement of the rate of change of the electric field at the sensor locations; this information could be processed and used to control time-varying voltages applied to a second set of electrodes, similarly located in a flush manner in the wall or grid adjacent to the plasma, which we call control electrodes. The total objective of the feedback control system including sensor and control electrodes and the processing unit would be to minimize the perturbations to the plasma and electron sheath. Although the detailed theory of feedback control has not been carried through specifically for the two-fluid diocotron instability, it may be reasonably conjectured that such control over plasma and sheath disruption will be most effective for weakly unstable modes, i.e., instability modes with a low rate of growth. It is thus advantageous even with a negative feedback system to maintain plasma parameters which do not deviate far from the parameters for marginal stability, specified according to initial theory on this subject by Eq. (5), or equivalently by Eq. (6) and FIG. 4. Thus the maintenance of close spacing between the plasma body and the adjacent wall or grid is advantageous to a magnetoelectric system with feedback control in order to retain low growth rates for the unstable modes. The close spacing is furthermore advantageous on the basis of simple electrostatic theory in achieving the desirable close electrical coupling between the plasma and the sensor and control electrodes.

The close spacing between the surface of the plasma body and the adjacent conducting wall or grid can be advantageous in another respect, in addition to its several advantages described above with respect to stabilization of the two-fluid diocotron mode. For a given potential difference between the plasma body and the conducting wall or grid, the strength of the surface electric field will increase as the plasma-wall spacing decreases. Now, the tensile stress on the plasma due to this electric field can influence the magnetohydrodynamic character of the plasma equilibrium. In detail, the well known equation of magnetohydrodynamic pressure balance across a layer of negligible thickness reads $$j^*B = \hat{b} \times \hat{n}[8\pi p - (\mathbf{E} \cdot \hat{n}) \text{ plasma}^2 + (\mathbf{E} \cdot \hat{n}) \text{ vacuum}^2]/8\pi \quad (7)$$

in which $j^*$ is the density of the total surface current flowing in the boundary layer measured in statamperes per cm, $B$ is the strength of the average magnetic field in gauss, $\hat{b}$ is a unit vector in the direction of the magnetic field, $\hat{n}$ is a unit vector directed perpendicular to and into the plasma surface, $p$ is the sum of the ion and electron pressures in dynes per cm² and $\mathbf{E}$ is the electric field in statvolts per cm. In applying the pressure balance equation to our configuration, we have taken the thickness of the electron sheath to be negligible for the purpose of this calculation and evaluated the electric field on the plasma side of this sheath (where, according to one embodiment of this invention, said electric field is actually of negligible magnitude) and in the vacuum gap between the sheath and the adjacent conducting wall or grid.

It is clear from Eq. (7) that a strong surface electric field can indeed affect the magnetohydrodynamic pressure balance, and it is possible to utilize this new degree of freedom in order to design and construct improved plasma apparatus. A particularly interesting example is that of magnetohydrodynamic equilibrium for a symmetric toroidal equilibrium in which the magnetic field has a finite toroidal component but zero poloidal components. In this example, the magnetic field lines are closed, and the magnetic field has zero rotational transform and zero sausage component. It is then not difficult to show from Eq. (7) in the absence of electric field effects that the divergence of the surface current, density, $j^*$, is different from zero, hence there must be a steady accumulation of electric charge at the plasma surface. If this accumulated charge is not somehow redistributed or drained off, the resultant electric fields which now build up will tend to drive the entire plasma outwards along the direction of the major radius of the torus. The nonexistence of equilibrium for this purely-toroidal configuration is a well-known result in plasma physics. However, in Physical Review Letters 24, 135 (1970) and in a paper entitled "Some Toroidal Equilibria for Plasma under Magnetoelectric Confinement" published in Physics of Fluids, Vol. 14, No. 3, pp. 682–701, Mar. 1971, T. H. Stix has shown that the presence of appropriate surface electric fields makes magnetohydrodynamic equilibrium possible for this axially-symmetric case in which the magnetic field is purely toroidal. For the confinement of a plasma of uniform density and temperature, the strength of the equilibrium surface electric field measured in the vacuum gap varies between $E_{max}$ (which occurs at those points on the toroidal surface which are closest to the axis of the torus) and $E_{min}$ (which occurs at those points farthest from the axis). If $N$ is the field strength ratio, $N = E_{max}/E_{min}$, then to lowest order in the aspect ratio $a/r$, where a is the minor radius of the torus and r is the major radius of the torus, the strength of $E_{max}$ for equilibrium is given by $$E_{max} = 3.8 \times 10^{-3} \left[ \frac{N^2}{N^2 - 1} \cdot \frac{a}{r} \cdot p \right]^{1/2} \quad (8)$$

where $E_{max}$ is in volts per cm, and $p$ is the total pressure of ions and electrons in the plasma measured in electronvolts per cm³ (i.e., $p = n_e kT_e + \Sigma n_i kT_i$, where $n_i$ and $n_e$ are the ion and electron densities in cm⁻³ and $kT_i$ and $kT_e$ are temperatures in electron volts).

For the parameters considered in one embodiment of this invention, $a = 25$ cm, $r = 1,250$ cm, $n_{deuterium} = n_{tritium} = 5 \times 10^{13}$ cm⁻³, $kT_e = 40$ keV, $kT_i = 100$ keV. Eq. (8) then gives $E_{max} = 2.0 \times 10^6 [N^2/(N^2-1)]^{1/2}$ volts/cm. From its definition, it is clear that $N > 1$, and thus the surface electric fields required for this zero-rotational-transform equilibrium and for the plasma parameters stated above always exceed 2.0 million volts per cm. Correspondingly, if the negative plasma bias is produced by the loss, from the quasi-neutral body of plasma, of fusion-product 3.52 MeV alpha particles, the magnitude of the bias will not exceed $1.76 \times 10^6$ volts and the separation between the surface of the quasi-neutral body of plasma and the adjacent conducting wall or grid must be less than or of order of $1.76 \times 10^6/2.0 \times 10^6$ cm, that is, less than or of order of one cm. The exact value of this separation will, of course, depend on the actual distribution of electron density in the sheath and on the value for N. Thus the increased ability to achieve an advantageous configuration for the plasma equilibrium is an additional reason -- beyond the question of suppression of instabilities -- for designing and constructing a magnetoelectric plasma containment apparatus with close spacing, typically of order or less than a centimeter, almost everywhere between the plasma surface and the adjacent conducting wall or grid.

We turn now to the problem of charge injection for the production and maintenance of the electron-rich sheath. The tendency for the development of this sheath by spontaneous processes in a toroidal fusion plasma even of conventional design was described in considerable detail above. It should be furthermore pointed out that this same process, the development of an electron-rich layer at the plasma surface due to the scrape-off of electrons and ions with vastly different gyro-radii, will be active in any plasma including those without fusion-product ions or even without suprathermal ions. In the absence of an electron leak which will degrade the process, the plasma will approach a bias potential which is negative with respect to the adjacent wall by an amount equal to the kinetic energy per unit charge of the most energetic ions.

To supplement this spontaneous process, it is possible to inject electrons from an external source in such a manner as to form and maintain the desired electron-rich sheath. One possible means for such injection is a magnetic process wherein an electric source is placed approximately flush with the wall or grid which envelops the plasma. The magnetic field in the device is made to increase with time and the electrons from the wall source are carried on the magnetic lines of force into the toroid volume. This method was proposed by J. D. Daugherty, L. Grodzins, G. S. Janes and R. H. Levy, in Physical Review Letters, 20, 369 (1968), and has been used successfully by this research team in their laboratory.

Another possible means for electron injection is the process which is here called rf magnetic injection and which is a variant of the above-described electron injection scheme. Consider the injection of cold electrons from a short annular region of the conducting wall or grid which envelops the toroid-like plasma. External $m = 1$ radio frequency coils cause the local magnetic field, B, to vary at frequencies of the order of the E/B drift frequency in the region between the quasi-neutral plasma surface and the wall, which is about 20 MHz for the parameters considered in one embodiment of this invention. Injected electrons with proper phase will then always see a rising magnetic field as they pass through the rf B. A positive trapping bias on the wall at the injection annulus can be used to maintain the parallel bunching of the electrons being injected. Physically, the cold injected electrons are diffused in configuration space by the rf field. Those electrons which reach the interior of the electron-rich sheath are then diffused in velocity space by scattering against hot sheath electrons, and the configuration-space density of trapped injected electrons at the electron wall source is correspondingly reduced.

The very weak diffusion of the untrapped electrons caused by the rf can be sharply reduced by placing two synchronous injectors side by side by 180° out of phase. Orbit deviations then tend to cancel for the untrapped electrons which transit both injection fields by moving parallel to the magnetic field.

Another topic in understanding the operation of a plasma fusion reactor is that of plasma heating. Conventional means may be used to heat a magnetoelectric plasma confinement device. These means include ohmic heating, injection of energetic neutral atoms, and heating by irradiation with electromagnetic energy. An example of the last method is cyclotron resonance heating means described in U. S. Pat. No. 3,015,618. However, in addition to these and other conventional methods, it is also possible to heat the plasma by a new method which is based on the principles of magnetoelectric confinement. For this method, consider a source of ions which is approximately flush with the conducting wall or grid which envelops the plasma. For a sufficiently strong electric field in the region between this source and the surface of the quasi-neutral body of plasma, it will result that ions injected from the source will be accelerated by this electric field and will fall inside the volume of the quasi-neutral plasma before these injected ions have been able to execute a full Larmor circle in the magnetic field. These injected ions arrive inside the quasi-neutral plasma with kinetic energy corresponding to the depth of the magnetoelectric potential well and they will undergo a cycloidal motion in the magnetic and electric fields which carries them back out to the wall on each cycle. Scattering by other ions and electrons, however, will reduce their energy perpendicular to the magnetic field and will cause them to be trapped inside the wall of the system and eventually, for many of them, inside the quasi-neutral plasma. As the motion of these ions is randomized, the energy from their acceleration through the magnetoelectric sheath will go into heating the plasma. One method for plasma heating then, is to use rf magnetic injection of electrons to maintain the magnetoelectric electron-rich sheath and utilize the potential drop of this sheath in injecting ions into the plasma in order to heat the plasma.

Figure 1:
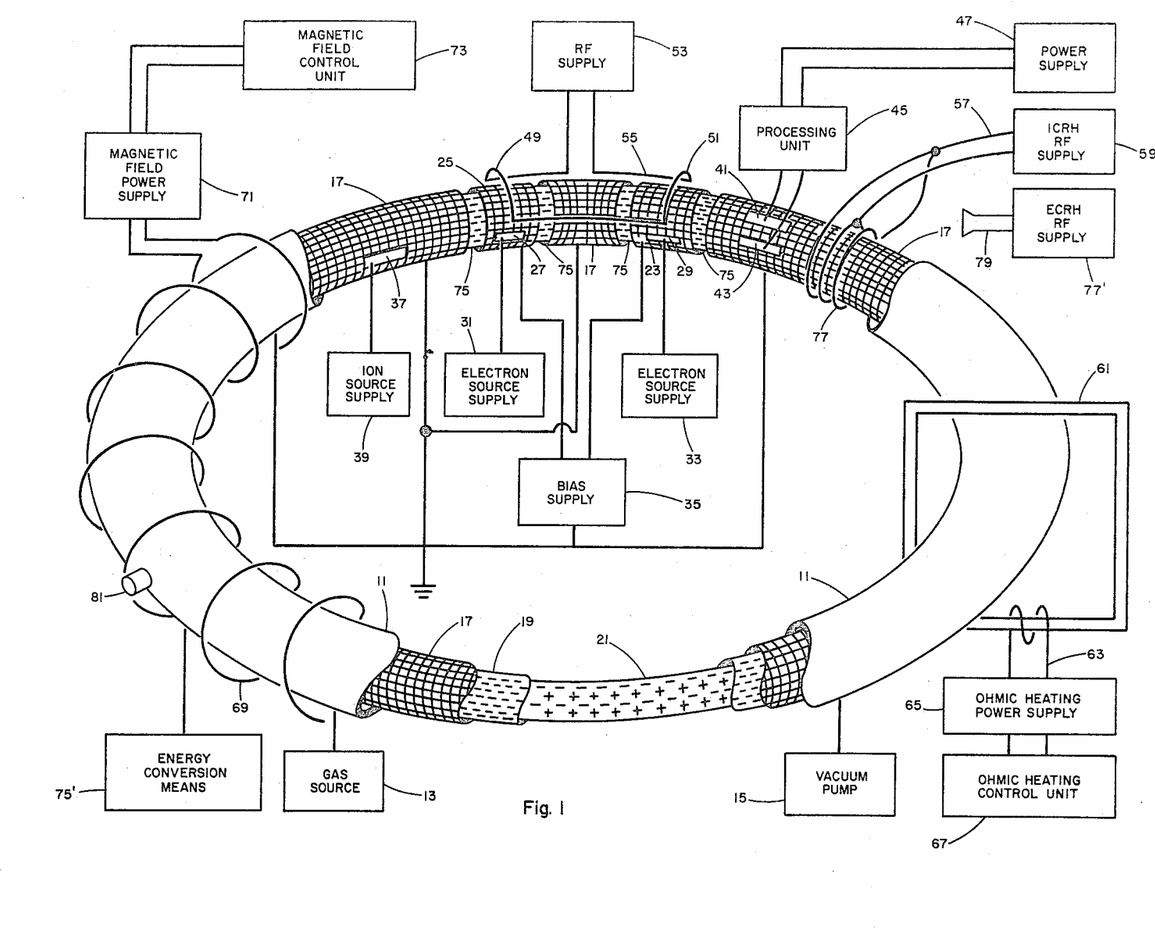
FIG. 1 is a cut-away three-dimensional view of the apparatus of this invention.

A sketch of one embodiment of apparatus for the magnetoelectric containment of plasma is provided in the cutaway drawing, FIG. 1, in which, for ease of illustration, most components are not illustrated in their entirety. A vacuum chamber, 11, envelops a toroid-like conducting wall or grid, 17. A magnetic field power supply, 71, furnishes power to magnet coils, 69, which produce a toroidal magnetic field in the region interior to wall 17. A vacuum pump, 15, exhausts chamber 11 while gas source 13 admits the desired amount of gas of the desired chemical composition.

Initially, the gas is ionized and heated and magnetically confined as in a conventional tokamak or stellarator apparatus, as described for instance in U.S. Pat. No. 3,016,341 by Spitzer. A radiofrequency signal from Ohmic heating control unit 67 is amplified by Ohmic heating power supply 65 and coupled to Ohmic heating transformer 61 through loop 63; the induced radiofrequency voltage in the region interior to wall 17 breaks down the gas in this region, forming a quasi-neutral plasma of ions and electrons, 21. Insulating gaps, 75, in the wall, 17, prevent a short-circuit current from flowing in conducting wall, 17, due to the Ohmic heating voltage from transformer 61. Further plasma heating is supplied by energizing ICRH radiofrequency supply 59 which is inductively coupled to plasma 21 by coil 57. In accordance with the method described in U.S. Pat. No. 3,015,618 by Stix, the frequency of the ICRH rf supply is advantageously made approximately equal to the ion cyclotron resonance frequency and the coil, 57, is advantageously constructed to provide oppositely-flowing currents in adjacent sections. The section, 77, of conducting wall 17 underneath coil 57 is constructed in the manner of a Faraday shield in order that the rf electric field due to coil 57 is not shorted out by eddy currents in the section, 77.

The ions in plasma 21, by virtue of their large mass, have gyro-radii much larger than the electrons in plasma 21. Some of these ions will diffuse out to wall 17, hit it and be absorbed. This absorption of ions near the surface of plasma 21 creates an electron-rich layer there, of the order of a gyro-radius in thickness. This electron-rich layer, 19, envelops plasma 21 and creates an electric field in the region between plasma 21 and wall 17. Plasma 21 is thereby biased negatively with respect to wall 17 and the ions in plasma 21 now find themselves located in a potential well of the proper polarity to improve their confinement. As pointed out in the earlier discussion, when the depth of said potential well is comparable to or exceeds several times the average kinetic energy per unit charge associated with said ions, the quality of this electrostatic ion confinement is much superior to the quality of the magnetic ion confinement.

As also pointed out in the earlier discussion, the electrons in sheath 19 are magnetically confined and tend to stick to their surfaces of constant total energy. However, diffusive and instability processes may be expected to cause an undesirable flow of negative charge out of sheath 19 to wall 17 and additional means for replenishing the electrons in sheath 19 are desirable as are means for suppressing said instability processes. To this end, one means for supplying electrons to sheath 19 is by magnetic injection, wherein electron source supplies 31 and 33 energize electron sources 27 and 29 located in an approximately flush manner on sections 25 and 23 respectively of wall 17. Simultaneously magnetic field control unit 73 causes magnetic field power supply 71 to increase the current through magnetic coils 69. The magnetic lines of force then move inward and electrons from sources 27 and 29 are carried on these lines into sheath 19.

An additional means for supplying electrons to sheath 19 is by rf magnetic injection. Coil 55 carries radiofrequency current from rf supply 53. As discussed earlier, legs 49 and 51 of coil 55 carry current in opposite directions, advantageously producing rf modulations of the main magnetic field, due to coil 69, which are 180° out of phase with each other. Electron source supplies 31 and 33 energize electron sources 27 and 29, and electrons emitted from these sources tend to be confined by the positive bias placed by bias supply 35 on annular sections 25 and 23 of wall 17. Sections 25 and 23 are electrically isolated from wall 17 by annular gaps 75. Electrons from sources 27 and 29 circumnavigate the region interior to annular sections 25 and 23 respectively at frequencies which are proportional to the strength of the local electric fields, said fields being produced by electron-rich sheath 19. As discussed earlier, the frequency of rf supply 53 is advantageously placed in the range of said frequencies of circumnavigation. Some of the circumnavigating electrons will now "feel" a rising magnetic field each time they pass under leg 49 or leg 51, and will be thereby transported inward to sheath 19. Scattering of these injected electrons by other electrons in sheath 19 will then tend to fill up sheath 19 with electrons in an approximately homogeneous manner.

Means is also provided for suppressing instabilities of plasma 21 and of sheath 19. Sensor electrodes 41 pick up an electric signal from an incipient instability or disturbance and transmit this signal to processing unit 45, which is energized by power supply 47. Processing unit 45 then returns a time-varying voltage to control electrodes 43, said voltage being of proper time-shape and magnitude to reduce or suppress said instability or disturbance on plasma 21 and sheath 19. Electrodes 41 and 43 are located in an approximately flush manner with respect to wall 17.

As another means for control of instabilities including the two-fluid diocotron instability discussed earlier, wall 17, together with components 23, 25, 27, 29, 37, 41 and 43 which are approximately flush with it, are constructed so that the surface facing sheath 19 and plasma 21 is extremely regular with a minimum of bumps, ripples, scratches, imperfections, etc. Moreover, magnetic coils 69 are also constructed and placed in an extremely regular fashion so that the deviations between the magnetic lines of force and the inner surface of wall 17 are minimized, said deviations being held to tolerances dictated by maximum allowable vacuum gaps as explained in the discussion of Eqs. (4), (5) and (6), and being typically of the order of a millimeter or smaller.

Additional means for plasma heating is available by ion injection through the surface electric fields. The electric field produced by electron-rich layer 19 is so directed as to accelerate ions from wall 17 into plasma 21. Ion source supply 39 energizes ion source 37, located in approximately flush manner with wall 17, and ions from source 37 fall through the electric field due to electron-rich sheath 19 into plasma 21. In plasma 21, collisions between these injected ions and the ions and electrons of plasma 21 randomize the energy of the injected ions and plasma 21 is thereby heated.

The Ohmic heating current induced in plasma 21 via transformer 61 produces a component of magnetic field which, added to the com-ponent of magnetic field supplied by current through coils 69, results in a total magnetic field for which the magnetic lines of force spiral around each other as they circumnavigate the torus. This resultant magnetic field system possesses a finite rotational transform, as is well known in the theory of stellarator and tokamak devices. When the electric field due to electron-rich layer 19 is of sufficient strength however, it is possible, as discussed earlier, to obtain an equilibrium configuration for the plasma, 21, and sheath, 19, enveloped by closely-adjacent wall, 17, in which no rotational transform is necessary. To reach this equilibrium. Ohmic heating control unit 67 is programmed to cause the toroidal Ohmic heating current carried in plasma 21 and in sheath 19 to go approximately to zero. In the resultant configuration, plasma equilibrium is obtained through a combined balance of particle, magnetic and electric stresses as explained above in the discussion of Eqs. (7) and (8).

As also explained above, it is advantageous for the creation and maintenance of this zero-rotational-transform equilibrium that wall 17 and the system components which are approximately flush with wall 17 be constructed in an extremely regular fashion so that there are a minimum of bumps, ripples, scratches, imperfections, etc., and that the deviations between the magnetic lines of force and the inner surface of wall 17 be minimized and held to tolerances determined by the equilibrium conditions as explained in the discussion of Eqs. (7) and (8), which would be typically of the order of a centimeter or smaller.

When plasma 21, containing ions of isotopes of hydrogen, helium and or lithium, is properly heated and confined as described above, a portion of said ions will interact in such a manner as to undergo nuclear fusion with a corresponding release of energy in the form of energetic neutral and charged fusion products. One use of the charged fusion products, already described, is in the maintenance of the electron-rich sheath 19 by virtue of the differential loss mechanism for ions and electrons. Speaking more generally, however, for controlled fusion purposes, the energy from said nuclear fusion reactions is converted to heat and to electricity for consumer usage. Means for said energy conversion have been widely discussed with respect to controlled fusion devices and suitable such apparatus is represented in FIG. 1 by unit 75'.

When used for production of controlled thermonuclear energy, parameters for one embodiment of this apparatus could be a minor radius of the toroidal wall 17 of 25 cm, a major radius of toroidal wall 17 of 1,250 cm, an average toroidal magnetic field due to coil 69 of 150 kilogauss, a density in plasma 21 of deuterium ions of $5 \times 10^{13}$ cm$^{-3}$ and of tritium ions of $5 \times 10^{13}$ cm$^{-3}$ and of electrons of $1.0 \times 10^{14}$ cm$^{-3}$ and a uniform density of electrons in sheath 19 of $1.0 \times 10^{14}$ cm$^{-3}$ and a thickness of sheath 19 of approximately 0.13 cm in order that the potential difference between conducting wall 17 and plasma 21 be $1.5 \times 10^6$ volts.

While the above has described several embodiments of this invention for confining a plasma for fusion application, it is under-stood that the apparatus of this invention also has utility as a stripped-ion source for heavy ion acceleration in conventional accelerators, such as described in my above-mentioned co-pending application. One suitable accelerator for this purpose is the alternating gradient synchrotron at the Brookhaven National Laboratory, this accelerator being described in U.S. Pat. No. 3,374,378 by Courant, who describes the acceleration of heavy ions by this conventional accelerator.

With regard to application of this apparatus as a source for highly-stripped ions, a suitable gas, such as xenon, is injected into the apparatus from gas source 13, partly ionized by Ohmic heating due to transformer 61, and confined by magnetic field due to both current in coils 69 and due to the Ohmic heating current. Electron-rich layer 19 is built up by differential scrape-off processes for ions and electrons, and is maintained by additional electron injection by magnetic injection and rf magnetic injection, described above. Equilibrium and stability may be enhanced by careful construction and placing of wall 17 particularly with respect to magnetic field from coils 69. An exposure time of the plasma 21 corresponding to $n_e t_i \sim 10^{10} - 10^{11}$ sec cm$^{-3}$, where $n_e$ is the density of electrons in plasma 21 and $t_i$ is the confinement time and the electron temperature is approximately 10 keV, is required to attain 50 percent removal of electrons for elements in the range $Z = °- 92$. The excellent ion confinement that can be obtained in the deep electrostatic well due to electron-rich sheath 19 in this apparatus facilitates attaining the required $n_e t_i$. Also, electron heating to $kT_e = 10$ keV, typically by electron cyclotron resonance heating means 77', supplied through antenna 79, provides the necessary energy to create and maintain the hot electron plasma required for efficient and strong stripping of heavy ions. Extraction of the stripped ions is accomplished through port 81.

In summary, the creation and maintenance of a dense electron-rich sheath enveloping a toroid-like quasi-neutral plasma will produce a strong difference of electrostatic potential between said plasma and a conducting wall or grid which envelops, in turn, said sheath. The strong surface electric fields due to said sheath provide a new and advantageous degree of freedom in the design of equilibria for plasma containment, including the possibility of obtaining toroidal magneto-electric containment in a magnetic field with zero rotational transform. In addition, the potential well created by said sheath can enormously enhance the ion confinement in a toroidal device, even one of otherwise conventional design. Additional use of this large potential difference is made in heating the plasma by ions injected into said plasma through said electric fields. The good confinement characteristics of magnetoelectric plasma containment can be utilized both in controlled fusion apparatus and in apparatus for ion stripping. Means for producing and maintaining the electron-rich sheath are available.

What is claimed is:

1. Apparatus for confining a plasma of ions and electrons, comprising a vacuum container, means for evacuating said container, means for providing a magnetic field in which magnetic lines of force circumnavigate inside said chamber many times, means for forming within said chamber a quasi-neutral plasma with approximately equal electric charge densities for ions and electrons, means for enveloping said plasma with a sheath whose composition is dominantly electrons but which may contain some ions, means for enveloping said sheath with an approximately adjacent conducting wall wherein the separation between said plasma and said conducting wall is smaller than one centimeter, and means for producing and maintaining said sheath at such density and over such spatial extent that the electrostatic potential difference between said wall and said plasma is larger than twice the average kinetic energy per unit charge associated with ions in said plasma.

2. The invention of claim 1 in which the apparatus is so constructed that the deviations between said conducting wall and the adjacent magnetic lines of force are smaller than one millimeter.

3. The invention of claim 1 having means forming sensor electrodes, control electrodes, and a processing unit for obtaining electrical signals from said plasma through said sensor electrodes, processing unit and control electrodes seriatim to supply time-varying voltages to said plasma to suppress disruptive effects of instabilities of said ions and electrons.

4. The invention of claim 1 in which the charge densities of said ions and electrons in said plasma are approximately equal and substantially uniform, and in which the temperatures of said ions and electrons are substantially uniform.

5. The invention of claim 1 in which said magnetic field is axisymmetric with components only in the toroidal direction.

6. The invention of claim 1 wherein the ions of said plasma include energetic ions of isotopes of hydrogen, helium and/or lithium and wherein thermonuclear energy is released due to the interaction of said energetic ions.

7. The invention of claim 1 wherein the ions of said plasma are stripped of a large fraction of their electrons and wherein said apparatus is used as a source for said highly-stripped ions, including use as a source for a heavy-ion accelerator.

8. The method for magnetoelectric confinement of a quasi-neutral plasma of ions and electrons in a magnetic field which circumnavigates the interior of a vacuum container many times, comprising the steps of producing, stabilizing, and maintaining an electron-rich sheath between said quasi-neutral plasma and an approximately adjacent conducting wall wherein the separation between said plasma and said conducting wall is smaller than one centimeter, where the density and spatial extent of said sheath are such that the difference in electrostatic potential between said plasma and said wall is larger than twice the average kinetic energy per unit charge associated with ions in said plasma.

9. The method of claim 8 in which said sheath is produced by scrape-off at the plasma surface in which the scrape-off of both ions and electrons tends, because of their vastly different gyro-radii, to reduce the densities of said ions and electrons in the vicinity of said sheath in an unequal fashion.

10. The method of claim 9 in which the scraped-off ions comprise those ions whose kinetic energies exceed twice the average kinetic energy of ions in said plasma, fusion-product-ions and runaway ions.

11. The method of claim 8 in which said sheath is produced by magnetic injection of negative electric charge, comprising electrons injected toward said plasma from the vicinity of said wall whereby the strength of said magnetic field is made to increase with time in order that said electrons will be transported into a region interior to said wall by the moving of said magnetic lines of force.

12. The method of claim 8 in which said sheath is produced by rf magnetic injection, whereby said magnetic field is modulated at high frequency over a small region in the vicinity of a portion of said sheath in order that electrons from an electron source located in the vicinity of said portion of sheath and in the vicinity of said wall, will be transported into the region interior to said wall.

13. The method of claim 8 in which the frequency of modulation is made to lie within the range of frequencies with which electrons in said sheath circumnavigate said plasma.

14. The method of claim 12 in which said rf modulation of the local magnetic field is performed at two adjacent locations spaced out somewhat from each other along a static magnetic line of force and in which said two modulations are out of phase with each other.

15. The method of claim 12 in which a portion of said wall in the vicinity of said rf modulation field and in the vicinity of said electron source is given a positive potential bias with respect to the remainder of said wall in order to better confine electrons from said source within the region of said rf modulation field during the period of their rf magnetic injection.

16. The method of claim 8 in which said plasma is heated by the acceleration of ions from an ion source located in the vicinity of said wall that fall through an electric field produced by said sheath and whereby said energy gained by said falling ions is at least partly randomized in said plasma and helps to heat said plasma.

17. The invention of claim 16 in which means are employed approximately simultaneously to inject negative charge into said plasma and said sheath in order to neutralize the injection of positive charge by said falling and randomizing ions.

* * * * *